3,205,703
RESILIENT SEAL DEFORMATION TESTING
Wells J. Horvereid, Minneapolis, Minn., assignor to Precision Associates, Inc., Minneapolis, Minn., a corporation of Minnesota
Filed Oct. 19, 1961, Ser. No. 146,276
7 Claims. (Cl. 73—88)

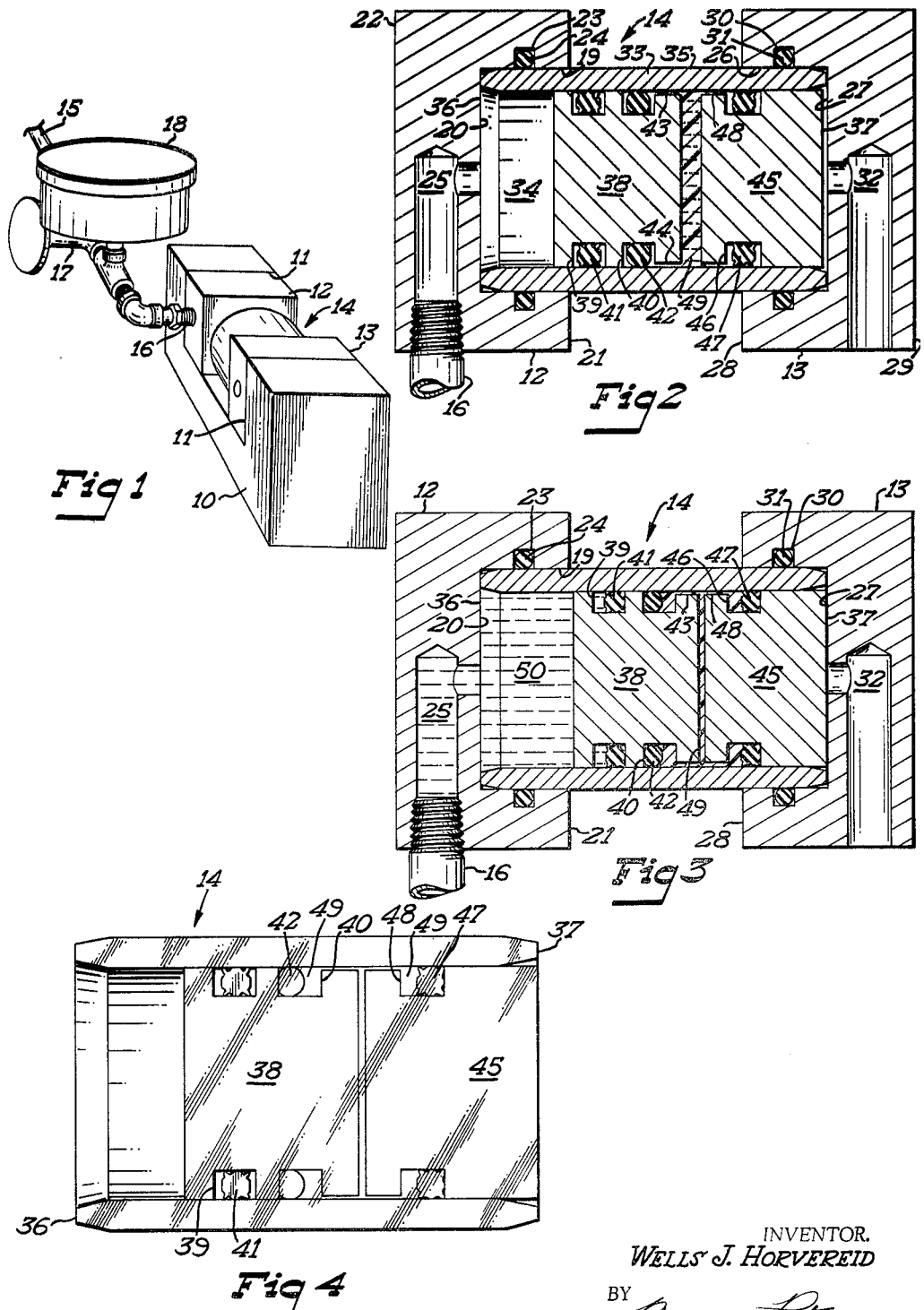

This invention relates to the determination of deformation characteristics of resilient bodies and more particularly to test specimens of ring seals which can be visually inspected and to the method by which the specimens can be prepared.

In the designing and engineering of seal systems, it has become the practice to selectively vary the material, the conformation of system components, and the hardness and resilience of the seal to meet the requirements of a particular application. Additionally, the size of grooves for holding the seals, the clearances between the parts to be sealed and the character of the fluid and pressure ranges thereof are some of the factors which must be considered and evaluated when devising seal systems which must operate under difficult conditions. It is well known, for example, that a simple rubber O-ring may fail if it is too hard or too soft, or if the pressures are too high or too low. Again, too much clearance between the moving parts or inadequate provision for proper movement and distortion of the sealing ring may result in early failure thereof under actual operating conditions.

Ordinarily, a rough estimate is made in selecting the variables, drawing upon previous experience and analogous situations. Sometimes a device which requires sealing has been inflexibly dimensioned and a resilient sealing ring must be designed to conform to the predetermined parameters of the system. After the rough estimate as to what type of sealing ring would function properly for a given situation, tests are run to determine the pressure point or time of failure of the tested ring. In some instances, the ring will twist. Sometimes it will distort beyond recovery. On occasions the ring will scrub, extrude or heat from friction and occasionally the tested ring will simply not properly seal under the prescribed conditions.

It is recognized that there are too many variables in the design of resilient seals systems to arrive at an immediate and certain answer for any specific situation. However, it is within the contemplation of the instant invention to employ a novel testing technique which will add knowledge of operating conditions which heretofore has been unavailable to the experimental engineer. While not purporting to be a complete testing technique, the invention often gives information which can eliminate or render unnecessary protracted breakdown tests. Also, an attribute of the invention lies in the scientific observation of flow and deformation characteristics of resilient objects under pressure wherein the object is fixed in its deformed position and subsequently rendered capable of study and observation.

It is therefore a general object of the invention to provide a method for testing the deformation characteristics of a resilient object such as an O-ring and to provide a test specimen which becomes a permanent visible record of the test.

More specifically, it is an object of the invention to place a resilient seal system under pressure wherein the pressure side of the resilient seal ring will be filled with a fluid or plastic material capable of setting while the ring is maintained in its deformed conformation.

Another object of the invention is the production of a visible specimen from the physical resilient seal system containing the set plastic by cutting transversely through the entire system, including the deformed seal and the pressurized and set plastic material.

A still further object is the deforming of a pair of resilient seals which may be of the same or different character and setting in situ of a plastic matrix around the seals to preserve their deformation under pressure so that they may be cut transversely and be subsequently observed and studied.

These and other objects and advantages of the invention will more fully appear from the following description, made in connection with the accompanying drawing, wherein like reference characters refer to the same or similar parts throughout the several views and in which:

FIGURE 1 is a perspective view of the test specimen mounted within the testing apparatus;

FIGURE 2 is an enlarged cross-section of the test specimen mounted in the end blocks and showing unset plastic material in place with the piston members in relaxed condition;

FIGURE 3 is a view similar to that of FIGURE 2 showing hydraulic pressure applied to the cylinders to compress the plastic material and the resilient seals; and, FIGURE 4 shows a further enlarged side elevation of the test specimen which has been transversely cut with the plastic in set condition and the resilient seal in pressurized and deformed conformation.

With continued reference to the drawing, FIGURE 1 shows the test apparatus with the test specimen in place and ready to receive the applied force. A convenient apparatus includes a simple C-block 10 having parallel opposed faces 11 for holding in spaced relation the respective end blocks 12 and 13. The test specimen unit is indicated generally at 14 and a fluid pressure line 15 is connected to the end block 12 by a threaded connector 16 as shown. A conventional valve 17 and a pressure gauge 18 may be supplied to control the operating conditions of the test apparatus.

Referring now to FIGURES 2 and 3, the test block 12 may be rectangular in character and constructed of steel or similar rigid material having a circular bore or recess 19 formed therein with an abutment wall 20 lying intermediate the inner wall 21 and the outer wall 22 of the end block 12. A circumferential groove 23 is formed in the bore 19 so as to retain a sealing ring 24 as shown. A passageway 25 threadedly receives the tube connection 16 and communicates with the bore 19 through the abutment wall 20 as shown. The opposed end block 13 is similarly formed with a bore or circular recess 26 and has an abutment wall 27 lying intermediate the inwardly facing wall 28 and the outwardly facing wall 29 of the end block 13. Here again, a groove 30 is formed at the inner circumferential surface of the bore 26 and is adapted to receive a resilient sealing ring 31 as shown. A relief passageway 32 is formed in the body of the end block 13 and communicates through the abutment wall 27 with the atmosphere as shown.

The test specimen unit 14 essentially consists of members in proximal relationship between which is disposed means for retaining a resilient body in sealed relation. A convenient device for supplying the essential elements comprises a simple metallic sleeve or cylinder 33 having a cylinder bore 34 internally and a cylindrical surface 35 externally. The external surface 35 has a diameter such that the sleeve or cylinder 33 will fit snugly in the bores 19 and 26 of the respective end blocks 12 and 13. The cylinder 33 is open-ended and terminates in a chamfered edge 36 which presses against the abutment wall 20 in end block 12 and a corresponding edge 37 which abuts against the wall 27 in end block 13. The open ends of the sleeve or cylinder 33 are thus effectively sealed by the sealing rings 24 and 31 in their respective end blocks 12 and 13.

Lying within the cylinder 33 and in contact with the bore 34 is a piston 38 having a pair of grooves 39 and 40 formed circumferentially thereabout in spaced relation. An oil seal ring 41 may be placed in the groove 39 so as to prevent oil from passing into the inner groove 40, as will be subsequently apparent. The groove 40 contains a resilient body to be tested, for example, an O-ring or annular sealing member 42 of given dimension and rubber composition. In order to insure communication between the interior of the cylinder bore and groove 40, the circumference of piston 38 at its inner margin 43 may be decreased to form a slight clearance 44 as shown.

Another piston 45 may be utilized to provide a second test within the same specimen unit 14 and when so used is provided with a groove 46 for retaining a resilient body such as a specially designed sealing ring 47. Here again the circumference of the piston 45 is reduced at 48 so as to insure communication between the inner cylinder space and the groove 46.

Preparatory to testing, a quantity of fluid, but settable, plastic material 49 is placed within the cylinder 33 and between the pistons 38 and 45. The condition of the test specimen unit 14 prior to application of pressure appears in FIGURE 2 wherein each of the resilient rings 41, 42, and 47 are retained in their respective grooves 39, 40 and 46.

In carrying out the testing method, fluid pressure is applied through the line 15 to the passageway 25 as shown in FIGURE 3. Hydraulic fluid 50 thus enters the cylinder 33 and forces the piston 38 to the right as shown. The piston 45 also moves to the right and becomes bottomed against the abutment wall 27, any entrapped air within the cylinder 33 beyond the piston wall 37 being permitted to escape through the passageway 32. The unset plastic material 49 oozes past the reduced piston portions 43 and 48 so as to enter the grooves 40 and 46, respectively. The sealing ring 42 will thus be moved to the left and distorted under pressure while the sealing ring 47 will be caused to move to the right and also will be distorted under the same pressure. Each of the test rings 42 and 47 assumes a characteristic distortion depending upon certain factors which were mentioned earlier in this specification. The conformation of the test seals however, can not be determined at this point because they are obscured within the cylinder 33.

The plastic material 49 may be of any character which will flow readily in unset condition, yet will harden to a strong fixed mass after the passage of a reasonable length of time. Polyester resins, epoxy compounds and even hydraulic setting materials have been successfully employed.

With the pressure maintained upon the pistons and cylinder, the resilient deformed bodies 42 and 47 are confined in their deformed condition by the set plastic 49. The test specimen unit 14 can then be simply removed from the end blocks 12 and 13 after pressure has been released from the fluid pressure line 15, and the apparatus may be made ready for another test procedure. It is understood of course, that the apparatus, including the end blocks 12 and 13, can be reused while the test specimen unit 14 may constitute one of a multiplicity of similar units.

After removing the specimen unit 14, the cylinder 33, pistons 38 and 45, plastic 49 and seal rings 41, 42 and 47 may all be cut transversely in section to expose the cross-sectional appearance of the rings as they lie within their respective grooves. Since the plastic material 49 is now in set condition, the deformed character of the rings 42 and 47 will be maintained and can be visually observed and inspected. The ring 41 on the other hand is merely an oil seal and hence will return to its original conformation. The ring 41 thus may be used comparatively with the ring 47 to determine its pressurized and non-pressurized conformation.

It will, of course, be understood that various changes may be made in the form, details, arrangements and proportions of the parts without departing from the scope of my invention as set forth in the appended claims.

What is claimed is:
1. The method of testing experimentally the deformation characteristics of a resilient body between retaining members, said method comprising:
(a) flowing a settable plastic material between said retaining members and against the resilient body,
(b) applying a predetermined pressure to said plastic material and resilient body to deform the same and conform the plastic material to the contacting surface of said resilient body,
(c) maintaining the pressure until said plastic material has hardened in contact with the deformed body,
(d) then cutting transversely of the body, the associated members and the set plastic material so as to render visible in cross section the deformed condition of the pressurized resilient body.

2. The method of testing experimentally the deformation characteristics of a resilient sealing ring between retaining members, said method comprising:
(a) flowing a settable plastic material between said retaining members and against the resilient sealing ring,
(b) applying a predetermined pressure to said plastic material and the resilient sealing ring to deform the same and conform the plastic material to the contacting surface of said sealing ring,
(c) maintaining the pressure until said plastic material has hardened in contact with the deformed sealing ring,
(d) then cutting transversely of the sealing ring, the associated members and the set plastic material so as to render visible in cross section the deformed condition of the pressurized resilient sealing ring.

3. The method of testing experimentally the deformation characteristics of a resilient sealing ring between retaining members, said method comprising:
(a) flowing a thermosetting plastic material between said retaining members and against the sealing ring,
(b) applying a predetermined pressure to said plastic material and resilient sealing ring to deform the same and conform the plastic material to the contacting surface of said resilient sealing ring,
(c) maintaining the pressure until said plastic material has hardened in contact with the deformed resilient ring,
(d) then cutting transversely of the sealing ring, the associated members and the set plastic material so as to render visible in cross section the deformed condition of the pressurized sealing ring.

4. The method of testing experimentally the deformation characteristics of a resilient sealing ring lying in a groove system between a cylinder and a piston, said method comprising:
(a) blocking one end of the cylinder and placing settable plastic material between the piston and the blocked end,
(b) placing the plastic material and the resilient sealing ring under predetermined pressure to deform the same,
(c) holding the pressure until said plastic material has hardened in contact with the deformed sealing ring,
(d) then cutting in longitudinal section through the piston, sealing ring, set plastic and the cylinder so as to render visible in cross-section the deformed condition of the pressurized sealing ring.

5. A test specimen unit comprising:
(a) a deformable resilient annular sealing member requiring examination in a deformed state,
(b) a quantity of settable plastic material engaging said annular sealing member, and
(c) means to apply pressure to the settable plastic material engaging and thus deforming said annular member whereby said plastic material conforms to the configuration of said annular member and thereafter sets to form a mold record of said annular member's deformation.

6. A test specimen unit for observing the conformation of a resilient sealing ring under pressure which comprises:
 (a) a cylinder,
 (b) a piston within said cylinder,
 (c) a circumferential groove formed about said piston and lying between said piston and said cylinder,
 (d) a resilient seal lying in said groove between said cylinder and said piston,
 (e) a settable plastic material in said groove in contact with said seal,
 (f) means to apply pressure to said settable plastic material to deform said resilient ring,
 (g) whereby said plastic material conforms to the configuration of said ring and thereafter sets to form a mold record of said resilient ring's deformation.

7. A test specimen unit for observing the conformation of a resilient sealing ring under pressure which comprises:
 (a) a cylinder,
 (b) a pair of opposed pistons within said cylinder,
 (c) a circumferential groove formed about each of said pistons and lying between said pistons and said cylinder,
 (d) a resilient seal lying in each of said grooves between said cylinder and said pistons,
 (e) a settable plastic material in each of said grooves and in contact with each of said seals,
 (f) means to apply pressure to said settable plastic material to deform said resilient seals, whereby said plastic material conforms to the configuration of said seals and thereafter sets to form a mold record of the deformation of said seals.

References Cited by the Examiner

UNITED STATES PATENTS

| | | | |
|---|---|---|---|
| 2,608,857 | 9/52 | La Torre et al. | 73—103 |
| 2,621,885 | 12/52 | Schmitt. | |
| 2,995,777 | 8/61 | Warnken | 25—118 |

RICHARD C. QUEISSER, *Primary Examiner.*

DAVID SCHONBERG, *Examiner.*